United States Patent
Shimada

(10) Patent No.: US 9,922,410 B2
(45) Date of Patent: Mar. 20, 2018

(54) IMAGE PROCESSING APPARATUS AND IMAGE PROCESSING METHOD

(71) Applicant: Olympus Corporation, Shibuya-ku, Tokyo (JP)

(72) Inventor: Yoshinao Shimada, Hino (JP)

(73) Assignee: Olympus Corporation, Tokyo (JP)

( * ) Notice: Subject to any disclaimer, the term of this patent is extended or adjusted under 35 U.S.C. 154(b) by 2 days.

(21) Appl. No.: 15/088,776

(22) Filed: Apr. 1, 2016

(65) Prior Publication Data
US 2017/0061646 A1   Mar. 2, 2017

(30) Foreign Application Priority Data

Aug. 26, 2015   (JP) ................................. 2015-167098

(51) Int. Cl.
*H04N 9/73*   (2006.01)
*G06T 5/50*   (2006.01)

(52) U.S. Cl.
CPC ...... *G06T 5/50* (2013.01); *G06T 2207/10016* (2013.01); *G06T 2207/10024* (2013.01); *G06T 2207/20221* (2013.01)

(58) Field of Classification Search
CPC ........... G06T 2207/10024; G06T 5/009; G06T 5/008; H04N 1/6027; H04N 9/646; H04N 5/2355; H04N 5/243; H04N 5/2351; H04N 9/73
See application file for complete search history.

(56) References Cited

U.S. PATENT DOCUMENTS

2014/0071310 A1*  3/2014  Kai .................... G06K 9/00281
                                                              348/223.1

FOREIGN PATENT DOCUMENTS

JP          2014-212415        11/2014

* cited by examiner

*Primary Examiner* — Twyler Haskins
*Assistant Examiner* — Carramah J Quiett
(74) *Attorney, Agent, or Firm* — John C. Pokotylo; Pokotylo Patent Services

(57) ABSTRACT

An image processing apparatus includes a saturation judgment section adapted to judge whether or not saturation of individual pixels making up image data of plural images falls within a high saturation area, the image data being acquired by picking up images of an object in time sequence; and an image combining section adapted to perform high-saturation comparative bright combination processing on the image data of plural images, where the high-saturation comparative bright combination processing involves replacing only pixels judged to fall within the high saturation area with a pixel value of a pixel which has a larger index including a luminance component.

9 Claims, 12 Drawing Sheets

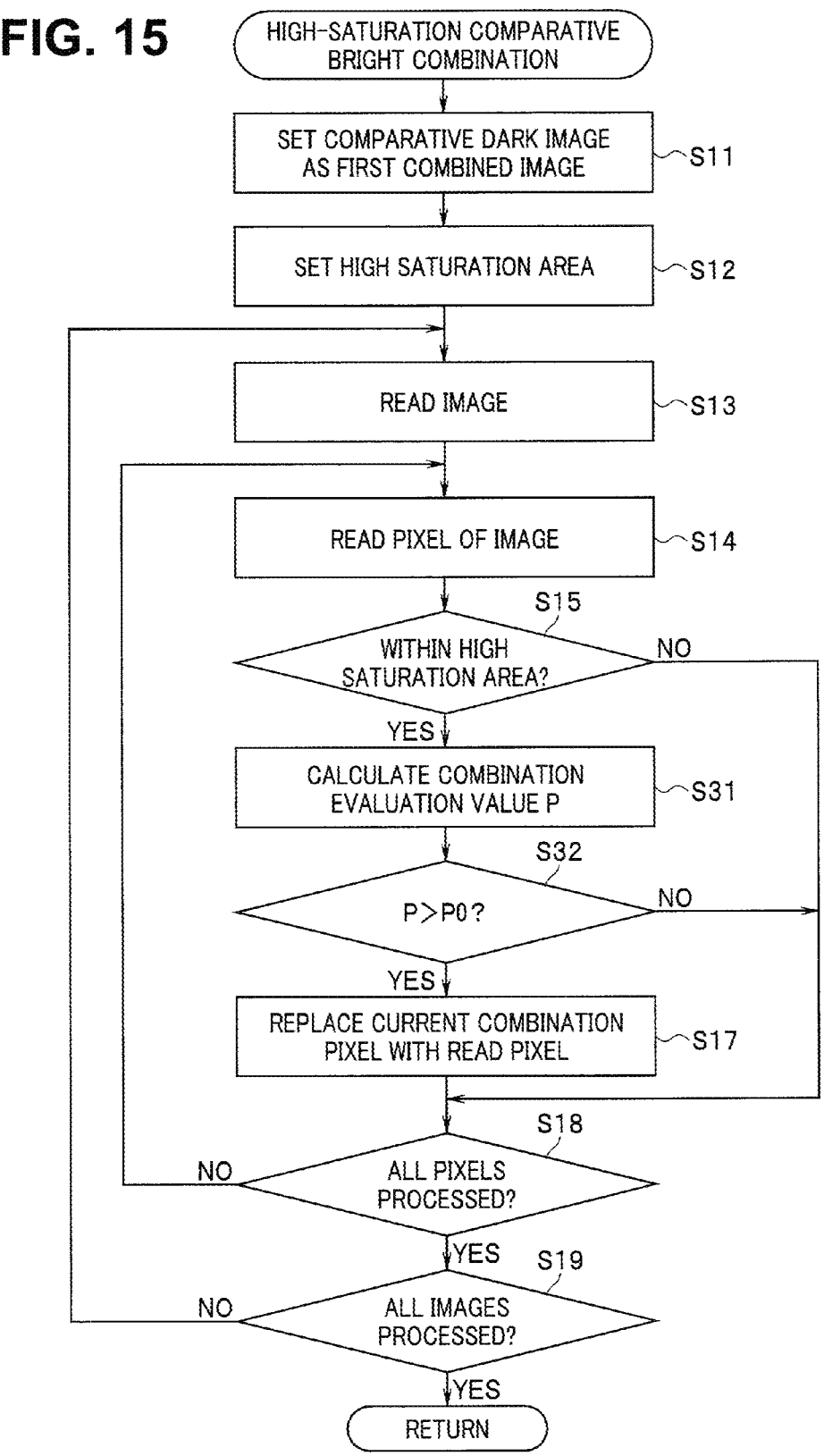

IMAGE PROCESSING APPARATUS AND IMAGE PROCESSING METHOD

CROSS REFERENCE TO RELATED APPLICATION

This application claims benefit of Japanese Application No. 2015-167098 filed in Japan on Aug. 26, 2015, the entire contents of which are incorporated herein by this reference.

BACKGROUND OF THE INVENTION

1. Field of the Invention

The present invention relates to an image processing apparatus and image processing method configured to combine image data for plural images picked up in time sequence.

2. Description of the Related Art

In recent years, image pickup apparatuses such as digital cameras equipped with a comparative bright combination processing function have been proposed. The comparative bright combination processing here involves a process of comparing pixel values at a same pixel position in plural images picked up in time sequence and replacing the pixel values at the pixel position with a larger pixel value.

The comparative bright combination processing is used for plural images picked up in time sequence at a necessary and sufficiently short shutter speed (so-called continuous shooting) in a photography scene containing a comparatively bright and small moving object and allows a trajectory of the moving object to be acquired as a good image with a high S/N ratio.

Some of photography scenes to which the comparative bright combination processing is applied include fireworks photography, astronomical photography, and photographing of moving headlight trajectories of a vehicle and the like at night.

For example, in the case of fireworks photography, a flow of bright spots making up fireworks lasting a few seconds are picked up in time sequence at a shutter speed shorter than the few seconds and plural images are acquired. Also, in the case of astronomical photography, very slow movements of stars on the celestial sphere are picked up in time sequence at a short shutter speed and plural images are acquired. Furthermore, in the case of moving headlight trajectories of a vehicle and the like at night, similarly the headlights are picked up in time sequence at a shutter speed shorter than a shutter speed corresponding to lengths of the moving trajectories to be photographed and plural images are acquired.

In any of the cases, if the plural images obtained are subjected to comparative bright combination, images with good S/N can be obtained by avoiding such image quality deterioration as will be caused by a dark current if a long shutter speed is used for photographing.

As such a technique, for example, Japanese Patent Application Laid-Open Publication No. 2014-212415 describes an image pickup apparatus equipped with a comparative bright combination processing section which repeats comparative bright combination processing each time new image data is acquired, where the comparative bright combination processing involves storing first image data as cumulative comparative bright combined image data, comparing newly acquired image data with the cumulative comparative bright combined image data on a pixel by pixel basis, and reorganizing the cumulative comparative bright combined image data using a larger pixel data as new pixel data.

Furthermore, Japanese Patent Application Laid-Open Publication No. 2014-212415 describes a technique which includes a comparative bright combination processing section and a comparative dark combination processing section, calculates differential image data between cumulative comparative bright combined image data and cumulative comparative dark combined image data, and combines together image data obtained by multiplying the cumulative comparative dark combined image data by a gain value and image data obtained by multiplying the differential image data by an arbitrary gain value.

SUMMARY OF THE INVENTION

An image processing apparatus according to one aspect of the present invention includes a saturation judgment section adapted to judge whether or not saturation of individual pixels making up image data of plural images falls within a high saturation area, the image data being acquired by picking up images of an object in time sequence; and an image combining section adapted to perform high-saturation comparative bright combination processing on the image data of plural images, where the high-saturation comparative bright combination processing involves replacing only pixels judged by the saturation judgment section to fall within the high saturation area out of the individual pixels making up the image data with a pixel value of a pixel which has a larger index including a luminance component.

An image processing method according to one aspect of the present invention includes a saturation judgment step of judging whether or not saturation of individual pixels making up image data of plural images falls within a high saturation area, the image data being acquired by picking up images of an object in time sequence; and an image combining step of performing high-saturation comparative bright combination processing on the image data of plural images, where the high-saturation comparative bright combination processing involves replacing only pixels judged in the saturation judgment step to fall within the high saturation area out of the individual pixels making up the image data with a pixel value of a pixel which has a larger index including a luminance component.

BRIEF DESCRIPTION OF THE DRAWINGS

FIG. 15 is a flowchart showing details of high-saturation comparative bright combination processing in step S3 of FIG. 13 in the above-described second embodiment.

DETAILED DESCRIPTION OF THE PREFERRED EMBODIMENTS

Embodiments of the present invention will be described below with reference to the drawings.

First Embodiment

Figure 1:
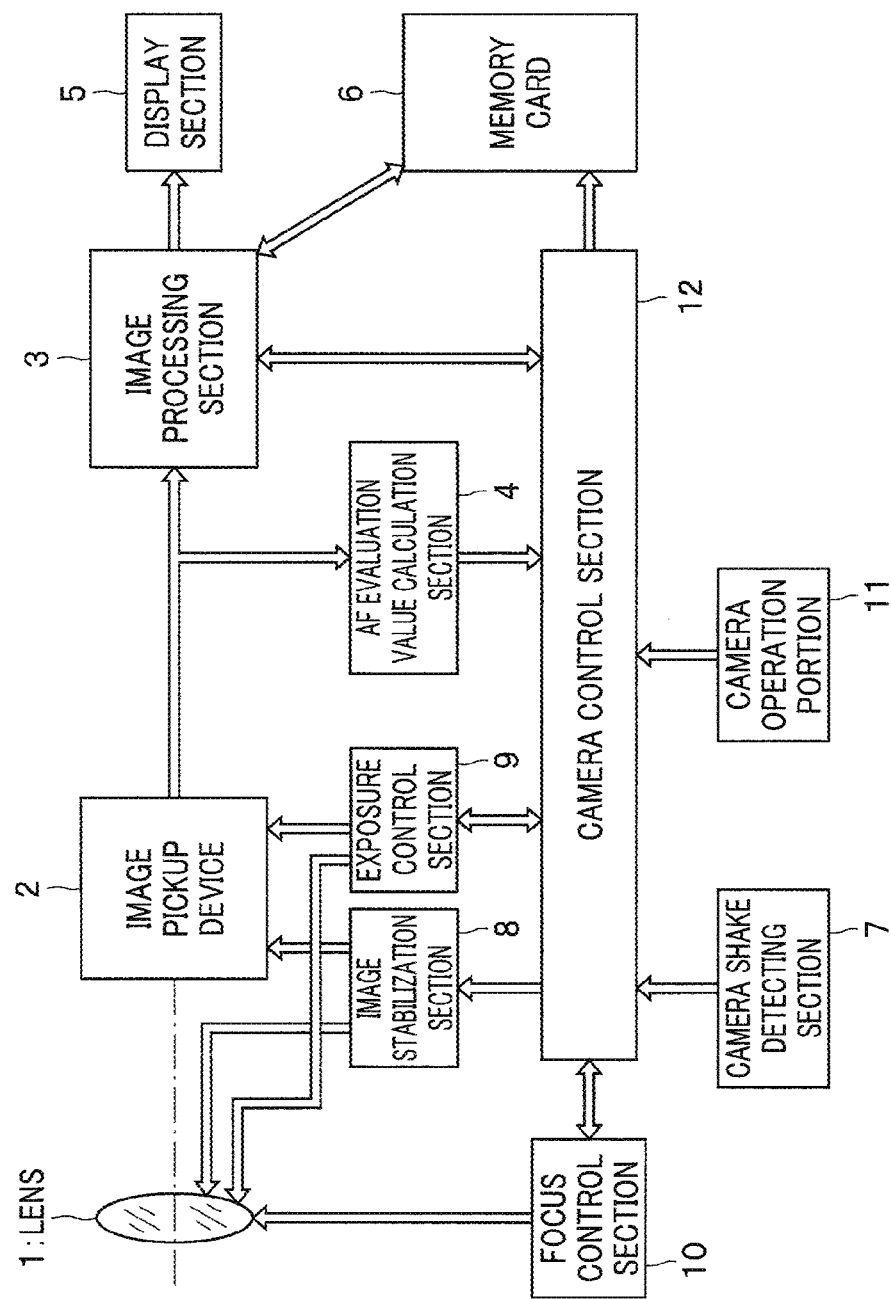
FIG. 1 is a block diagram showing a configuration of an image pickup apparatus according to a first embodiment of the present invention.

FIGS. 1 to 12 show a first embodiment of the present invention, where FIG. 1 is a block diagram showing a configuration of an image pickup apparatus. As described below, the image pickup apparatus according to the present embodiment has a function of an image processing apparatus adapted to process images obtained by image pickup.

As shown in FIG. 1, the image pickup apparatus includes a lens 1, an image pickup device 2, an image processing section 3, an AF (automatic focus) evaluation value calculation section 4, a display section 5, a camera shake detecting section 7, an image stabilization section 8, an exposure control section 9, a focus control section 10, a camera operation portion 11, and a camera control section 12. Note that although a memory card 6 is also illustrated in FIG. 1, the memory card 6 is configured to be detachable from the image pickup apparatus and does not need to be an inherent component of the image pickup apparatus.

The lens 1 is an image pickup optical system adapted to form an optical image of an object in an image pickup area of the image pickup device 2. The lens 1 includes a focus lens adapted to do focusing by adjusting focus position and a diaphragm adapted to control a range of a passing luminous flux. In the present embodiment, the lens 1 further includes an image stabilization function.

The image pickup device 2 is an image pickup section adapted to pick up (photoelectrically convert) an optical image of an object formed by the lens 1 and acquire and output image data. Note that although it is assumed in the present embodiment that the image pickup device 2 is a color image pickup device equipped with color filters arranged in a primary color Bayer array, of course, the image pickup device 2 may have another configuration. Also, the image pickup device 2 is configured to be movable in a plane perpendicular to a camera optical axis of the lens 1 and is equipped with an image stabilization function.

The image processing section 3 is designed to perform various kinds of image processing on image data outputted from the image pickup device 2 and create images for display or recording. A configuration of the image processing section 3 will be described in more detail later with reference to FIG. 4.

The AF evaluation value calculation section 4 is designed to calculate an AF evaluation value based on the image data outputted from the image pickup device 2 and output the AF evaluation value to the camera control section 12. For example, the AF evaluation value calculation section 4 calculates a contrast value based on the image data outputted from the image pickup device 2 and outputs the contrast value as an AF evaluation value.

The display section 5 is designed to display images based on a signal subjected to image processing for display by the image processing section 3. The display section 5 is designed to provide live view display, still image display, movie playback display, and the like as well as to display various pieces of information relevant to the image pickup apparatus.

The memory card 6 is a recording medium used to save image data (including still image data and movie data) processed for recording by the image processing section 3.

The camera shake detecting section 7, which includes an acceleration sensor or an angular velocity sensor, is designed to detect any camera shake of the image pickup apparatus and output resulting information to the camera control section 12.

The image stabilization section 8 is designed to move at least one of the lens 1 and image pickup device 2 under control of the camera control section 12 to offset the detected camera shake, thereby reducing influence of the camera shake on an optical object image formed on the image pickup area of the image pickup device 2.

The exposure control section 9 is designed to control a device shutter of the image pickup device 2 using a shutter speed (exposure time) determined by the camera control section 12 and thereby cause an image to be acquired, on instructions from the camera control section 12. Furthermore, the exposure control section 9 is designed to perform control and the like of the diaphragm contained in the lens 1, based on an f-stop number determined by the camera control section 12. Besides, the exposure control section 9 is designed to output drive information about the image pickup device 2 to the camera control section 12.

The focus control section 10 is designed to drive the lens 1 to adjust focus. That is, under the control of the camera control section 12, which has received an AF evaluation value from the AF evaluation value calculation section 4, the focus control section 10 brings the object image formed on the image pickup device 2 into focus by driving the focus lens contained in the lens 1. Also, the focus control section 10 is designed to output lens drive information including lens position to the camera control section 12.

The camera operation portion 11 is an operation portion used to enter various operation inputs in the image pickup apparatus. The camera operation portion 11 contains operating members, including a power switch used to power on and off the image pickup apparatus; a release button used to specify still-image shooting, movie shooting, and the like;

and a mode button used to set still-image shooting mode, movie shooting mode, live view mode and the like (where the still-image shooting mode includes high-saturation comparative bright combination mode as a more detailed mode).

The camera control section 12 is designed to control the entire image pickup apparatus including the image processing section 3, the memory card 6, the image stabilization section 8, the exposure control section 9, and the focus control section 10 based on the lens drive information from the focus control section 10, the AF evaluation value from the AF evaluation value calculation section 4, the drive information from the exposure control section 9, processing information from the image processing section 3, camera shake information from the camera shake detecting section 7, operation inputs from the camera operation portion 11, and the like.

Based on automatic exposure control or based on set values received from the camera operation portion 11, the camera control section 12 determines the shutter speed (exposure time) and f-stop number and outputs information about the determined shutter speed and f-stop number to the exposure control section 9.

When the high-saturation comparative bright combination mode is set, the camera control section 12 functions as a control section which causes the image pickup device 2 via the exposure control section 9 to pick up images in time sequence and acquire image data for plural images.

Figures 2, 3:
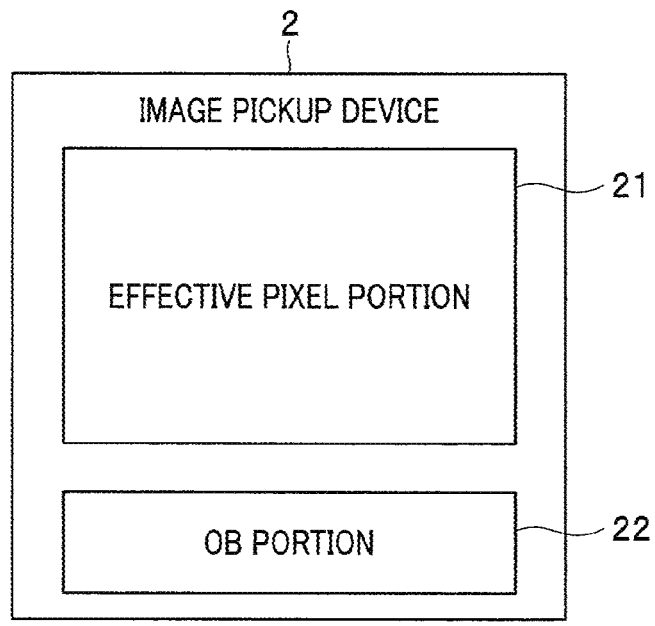
FIG. 2 is a diagram showing a configuration of an image pickup device according to the above-described first embodiment.
FIG. 3 is a diagram showing an array of pixels in an effective pixel portion of the image pickup device according to the above-described first embodiment.

Next, FIG. 2 is a diagram showing a configuration of the image pickup device 2.

The image pickup device 2 includes an effective pixel portion 21 in which pixels adapted to receive light from the lens 1 and perform photoelectric conversion are arrayed in vertical and horizontal directions, and an optical black (OB) portion 22 in which light from the lens 1 is blocked.

FIG. 3 is a diagram showing an array of pixels in the effective pixel portion 21 of the image pickup device 2.

As shown in FIG. 3, color filters arranged in a primary color Bayer array are placed in the effective pixel portion 21 of the image pickup device 2. As is well known, the primary color Bayer array uses a 2 by 2 pixel array as a basic array, where green pixels Gr and Gb are placed at diagonal positions of the basic array, a red pixel R is placed on a same line as the green pixel Gr, and a blue pixel B is placed on a same line as the green pixel Gb.

Note that the color filters of a primary color Bayer array may be placed not only over the effective pixel portion 21, but also over an entire image pickup surface of the image pickup device 2 including the OB portion 22.

Figure 4:
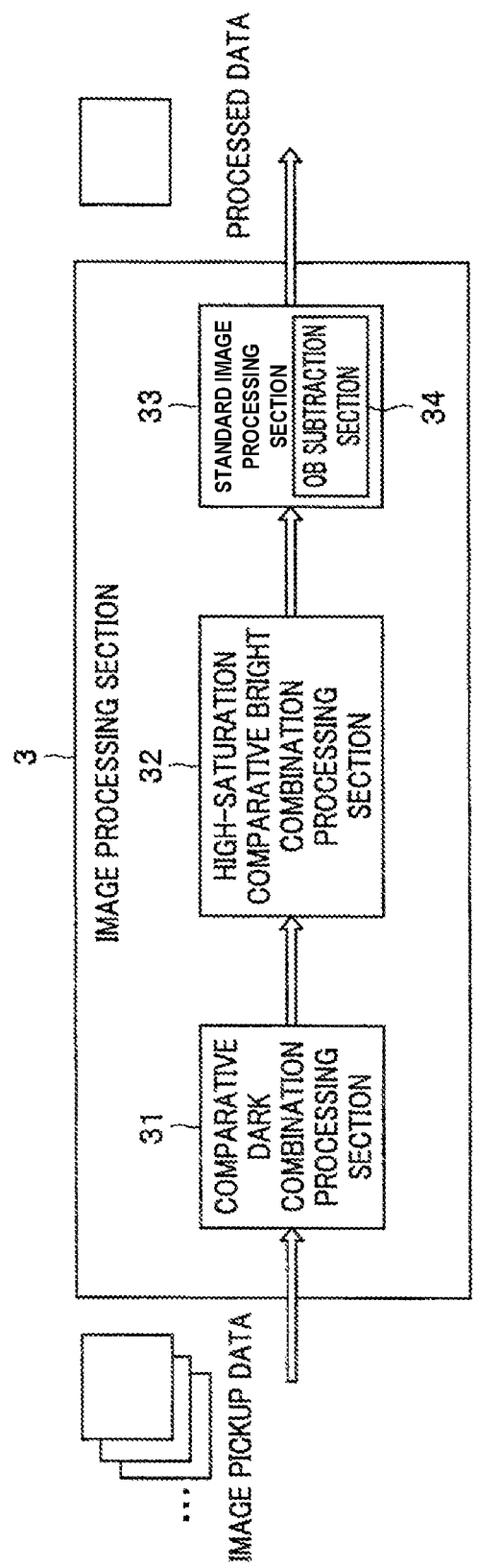
FIG. 4 is a block diagram showing a configuration of an image processing section according to the above-described first embodiment.

FIG. 4 is a block diagram showing a configuration of the image processing section 3.

The image processing section 3, which is an image combining section, includes a comparative dark combination processing section 31, a high-saturation comparative bright combination processing section 32, and a standard image processing section 33.

The comparative dark combination processing section 31 is designed to obtain comparative dark images by performing comparative dark combination processing on image data for plural images obtained by continuous shooting. The comparative dark combination processing here involves a process of comparing pixel values at a same pixel position in plural images and replacing the pixel values at the pixel position with the smaller pixel value.

The high-saturation comparative bright combination processing section 32 is designed to perform comparative bright combination processing by taking saturation into consideration as described in detail later with reference to FIG. 7 and the like. Here, in the present embodiment (and another embodiment described later), comparative bright combination processing is more generalized than typical comparative bright combination processing.

That is, the typical comparative bright combination processing involves a process of comparing pixel values at a same pixel position in plural images and replacing the pixel values at the pixel position with a larger pixel value.

In contrast, the comparative bright combination processing according to the present embodiment (and another embodiment described later) involves a process of comparing an index (index including a luminance component of the pixel) at a same pixel position in plural images, and replacing the pixel values at the pixel position with a larger pixel value. An example of the index is the pixel value itself as shown in the typical comparative bright combination processing, but as described later in the second embodiment, a combination evaluation value obtained by calculating a weighted sum of luminance and color difference components of pixels may be used as the index including the luminance component of the pixel.

While functioning as a saturation judgment section adapted to judge whether or not saturation of individual pixels making up image data for plural images falls within a high saturation area, the high-saturation comparative bright combination processing section 32 is designed to function as part of an image combining section which performs high-saturation comparative bright combination processing on the image data for plural images, where the high-saturation comparative bright combination processing involves replacing only pixels judged by the saturation judgment section to fall within the high saturation area out of the individual pixels making up the image data with a pixel value of a pixel which has a larger index including the luminance component.

The standard image processing section 33 is designed to perform standard image processing for creating an image for display or an image for recording, i.e., so-called development processing, on the combined image created by the comparative dark combination processing section 31 and high-saturation comparative bright combination processing section 32. The standard image processing section 33 similarly performs development processing on images obtained in ordinary still-image shooting mode other than the high-saturation comparative bright combination mode. With respect to the images obtained in ordinary still-image shooting mode other than the high-saturation comparative bright combination mode, respective processes of the comparative dark combination processing section 31 and high-saturation comparative bright combination processing section 32 are skipped as appropriate.

The standard image processing section 33 includes an OB subtraction section 34. The OB subtraction section 34 is designed to remove an offset component, fixed pattern noise, and the like from the effective pixel portion 21 by subtracting pixel values of the OB portion 22 from pixel values of the effective pixel portion 21 or by separately acquiring a shading image and performing frame subtraction when the exposure time (shutter speed) is comparatively long.

Figure 5:
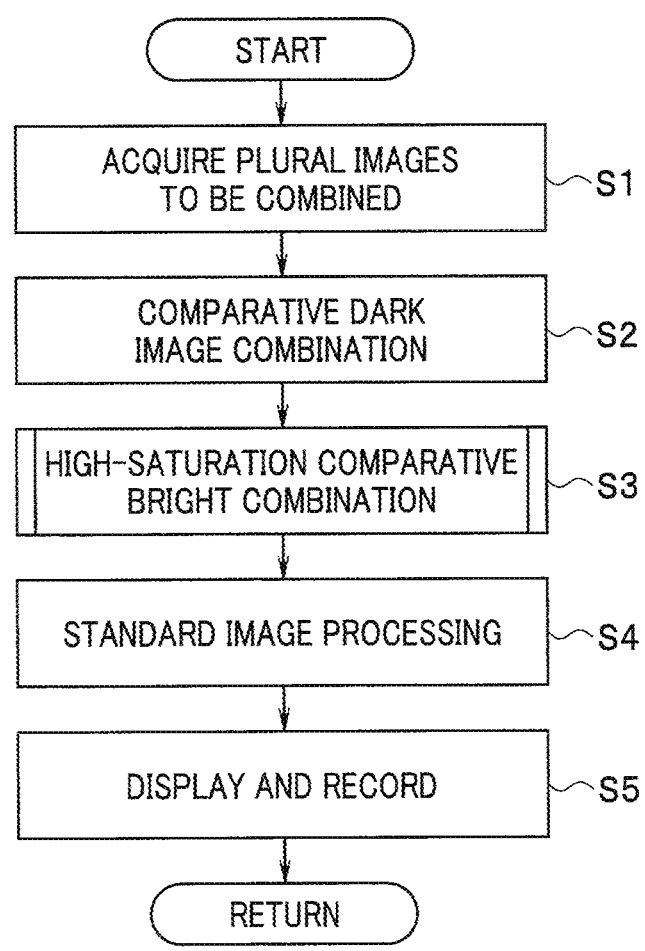
FIG. 5 is a flowchart showing a process of high-saturation comparative bright combination mode on the image pickup apparatus according to the above-described first embodiment.

FIG. 5 is a flowchart showing a process of the high-saturation comparative bright combination mode on the image pickup apparatus.

Upon entering the process of the high-saturation comparative bright combination mode from a main process (not shown), first, the image pickup apparatus acquires plural images to be combined in high-saturation comparative bright combination processing, under the control of the camera control section 12 (step S1).

Figure 6:
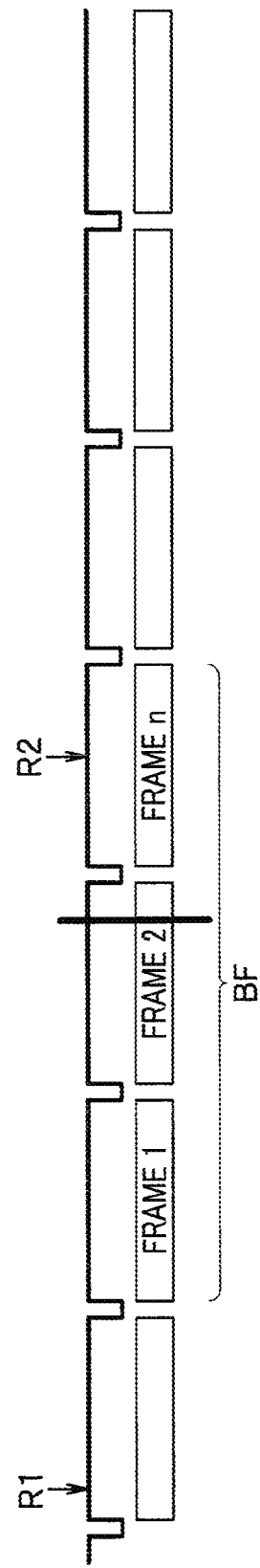
FIG. 6 is a timing chart showing how plural images to be combined are acquired on the image pickup apparatus according to the above-described first embodiment.

Now, FIG. 6 is a timing chart showing how plural images to be combined are acquired on the image pickup apparatus.

It is assumed that before starting shooting, the user has turned on an image stabilization function in advance or more preferably, has fixed image pickup apparatus, for example, to tripods. Then, as the user performs, for example, a first pressing operation R1 of the release button, plural images to be combined start to be acquired, with an image of frame 1 being acquired first. Next, respective images of frame 2, frame 3, ... are acquired in sequence. Subsequently, as the user performs a second pressing operation R2 of the release button, frame n (n is a positive integer), i.e., a last image of the plural images to be combined, is acquired. In this way, images of frame 1 to frame n provide frame information BF for high-saturation comparative bright combination.

Figure 9:
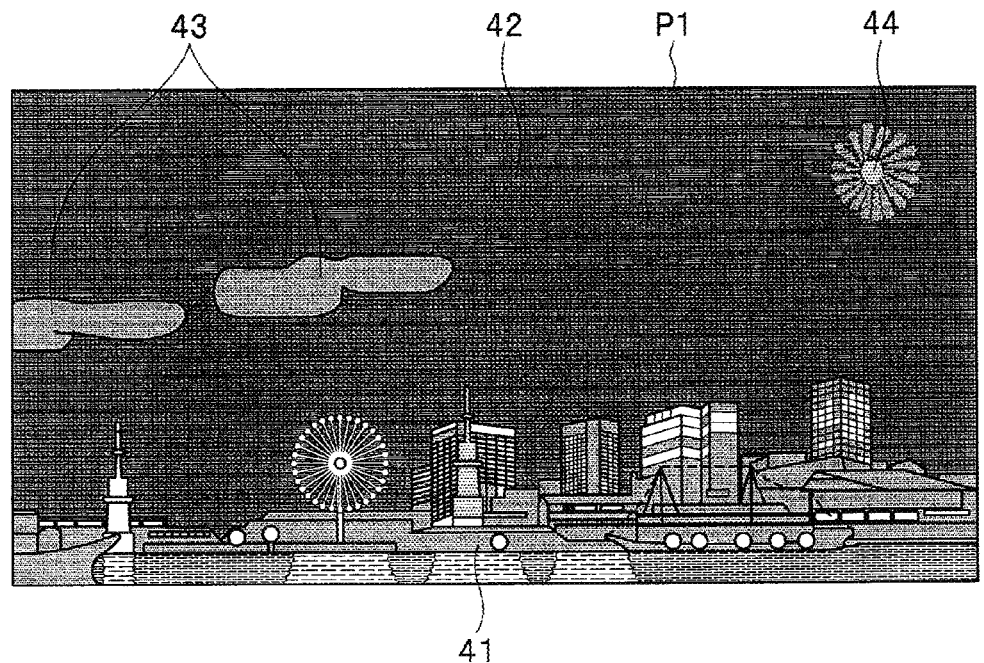
FIG. 9 is a diagram showing an example of a photography scene at a time point when an image of frame 1 is acquired in the above-described first embodiment.

FIG. 9 is a diagram showing an example of a photography scene P1 at a time point when the image of frame 1 is acquired.

In photography scene P1, there are a town night view 41, a night sky 42, and gray clouds 43 as well as fireworks 44 with low saturation.

Figure 10:
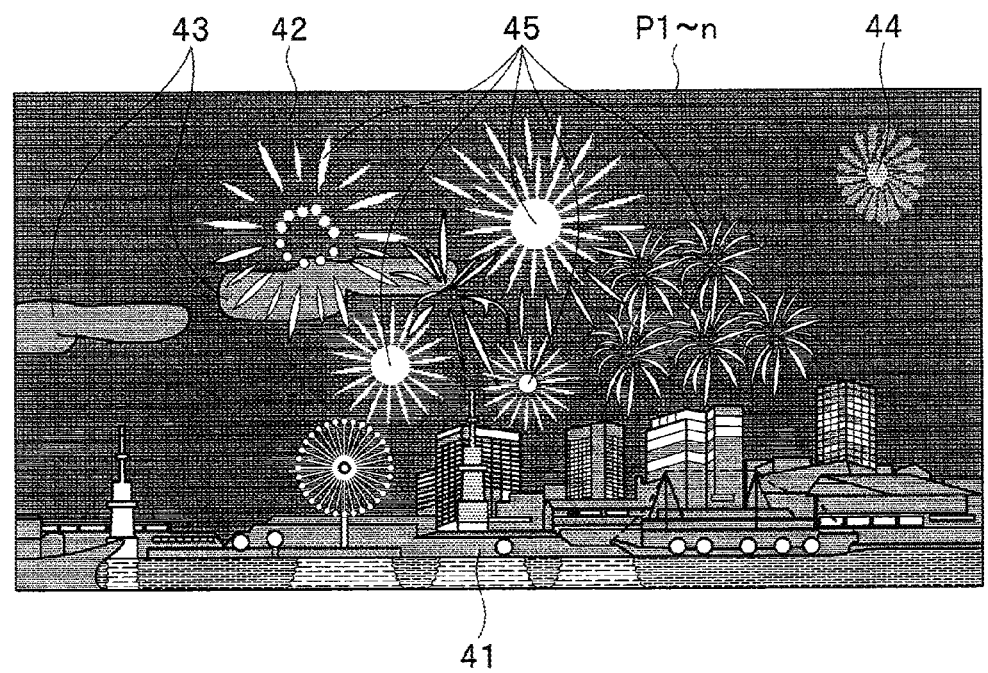
FIG. 10 is a diagram showing an example of a total photography scene during a period when images of frames 1 to n are acquired in the above-described first embodiment.

Also, FIG. 10 is a diagram showing an example of a total photography scene P1-n during a period when images of frames 1 to n are acquired.

The total photography scene P1-n further includes high-saturation fireworks 45 of various colors launched after photography scene P1. The total photography scene P1-n approximately coincides in appearance with an image obtained by performing typical comparative bright combination processing on the images of frames 1 to n.

Once the plural images to be combined are acquired in this way, the comparative dark combination processing section 31 creates a comparative dark image next (step S2). That is, the comparative dark combination processing section 31 selects a pixel with the smallest pixel value at each pixel position from the respective images of frames 1 to n acquired for high-saturation comparative bright combination processing, combines the pixels, and thereby creates a comparative dark image. As a result of this process, a background common to the plural images to be combined is extracted.

Figure 11:
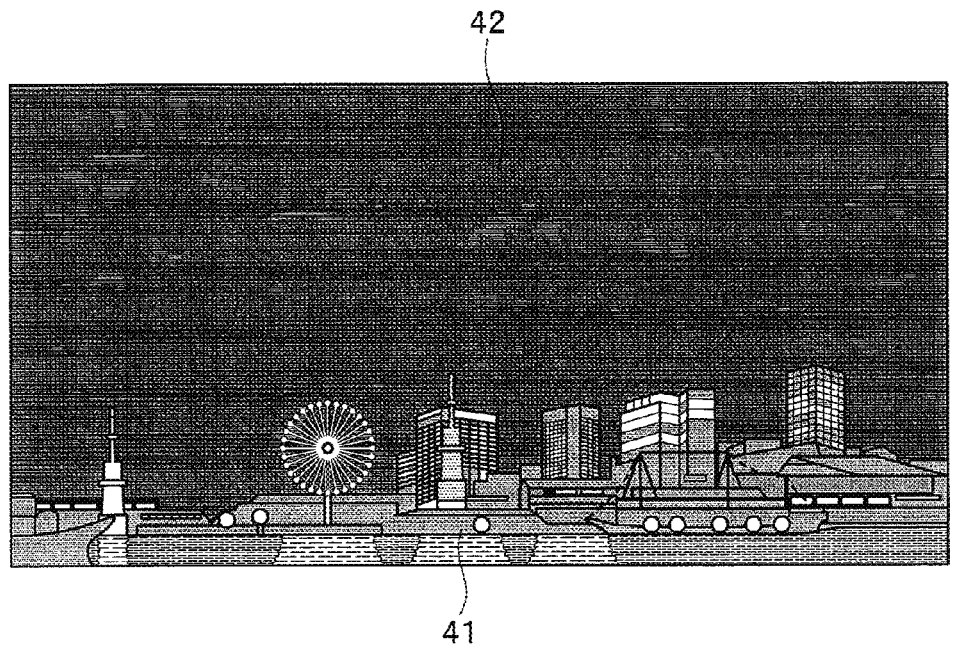
FIG. 11 is a diagram showing an example of a comparative dark image created based on the images of frames 1 to n in the above-described first embodiment.

FIG. 11 is a diagram showing an example of a comparative dark image created based on the images of frames 1 to n.

In the example shown in FIG. 11, the pixels with the smallest pixel value have been selected, and consequently, the town night view 41 and night sky 42 contained in any of frames 1 to n have remained while the gray clouds 43, the low-saturation fireworks 44, and the high-saturation fireworks 45 of various colors have been erased.

Figure 7:
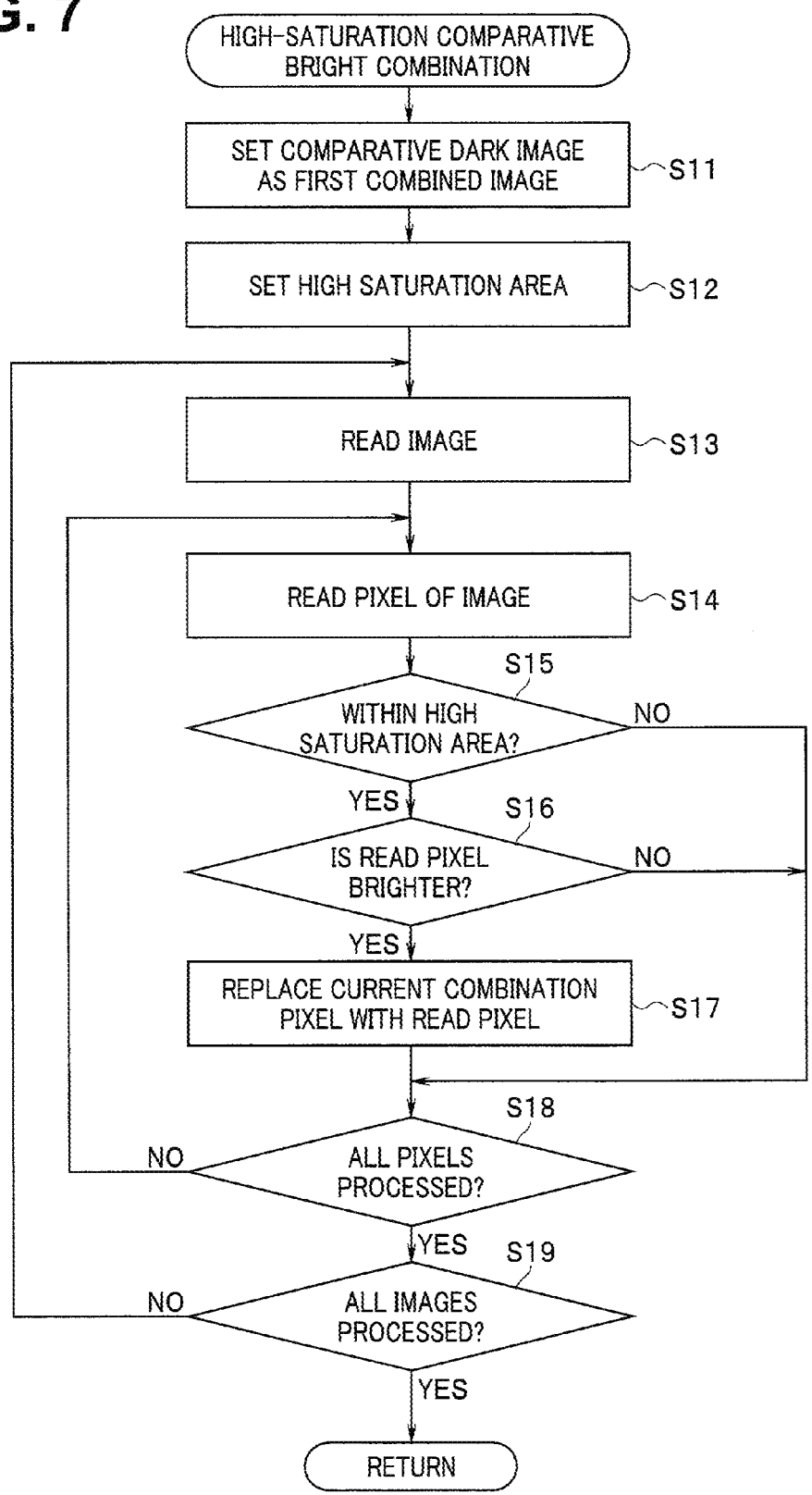
FIG. 7 is a flowchart showing details of high-saturation comparative bright combination processing in step S3 of FIG. 5 in the above-described first embodiment.

Next, high-saturation comparative bright combination processing described later with reference to FIG. 7 is performed by the high-saturation comparative bright combination processing section 32 (step S3).

Figure 12:
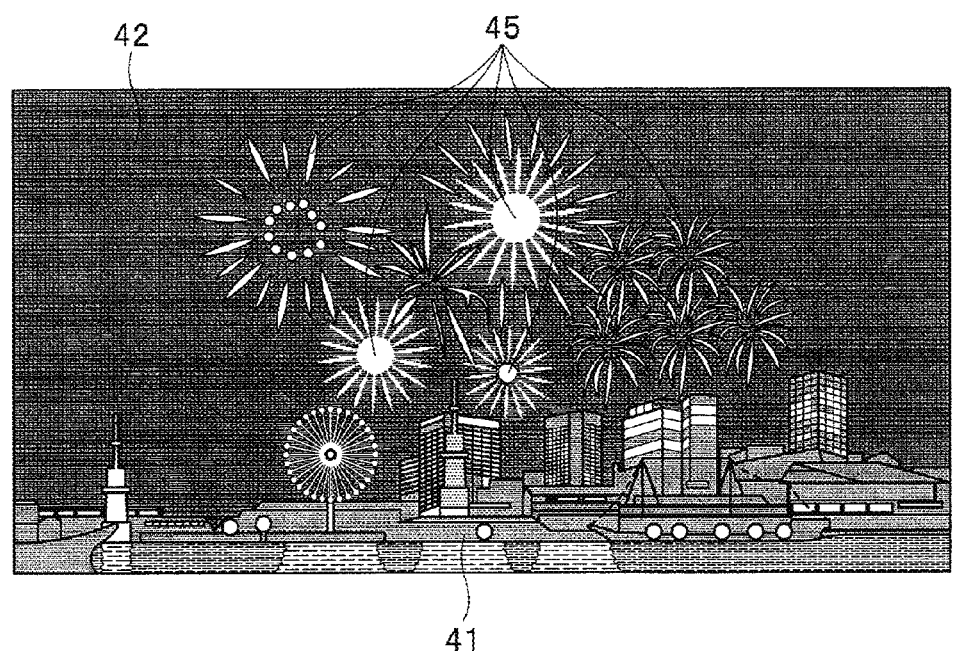
FIG. 12 is a diagram showing an example of a high-saturation comparative bright image created based on images of frames 1 to n in the above-described first embodiment.

FIG. 12 is a diagram showing an example of a high-saturation comparative bright image created based on the images of frames 1 to n.

When the high-saturation comparative bright combination processing according to the present embodiment is performed, the town night view 41, the night sky 42, and the high-saturation fireworks 45 of various colors remain while the gray clouds 43 and the low-saturation fireworks 44 are erased. That is, the gray clouds 43 and the low-saturation fireworks 44, which remain in the case of typical comparative bright combination processing, are removed from comparative bright combination in the present embodiment because of the low saturation and left out of the final combined image (see the process of FIG. 7).

Furthermore, standard image processing (so-called development processing) is performed on the combined image by the standard image processing section 33 (step S4), a created image is displayed on the display section 5 and recorded on the memory card 6 (step S5), and the image pickup apparatus returns from the current process to the main process (not shown).

FIG. 7 is a flowchart showing details of the high-saturation comparative bright combination processing in step S3 of FIG. 5. The high-saturation comparative bright combination processing is performed by the high-saturation comparative bright combination processing section 32, which is part of the image combining section, under the control of the camera control section 12.

Once this process is started, first the high-saturation comparative bright combination processing section 32 sets the comparative dark image created by the comparative dark combination processing section 31 in step S2 described above, as an initial value (first combined image) of the combined image in the high-saturation comparative bright combination processing (step S11). Consequently, the comparative dark image becomes a reference image in performing high-saturation comparative bright combination processing.

Next, a high saturation area is set (step S12).

Figure 8:
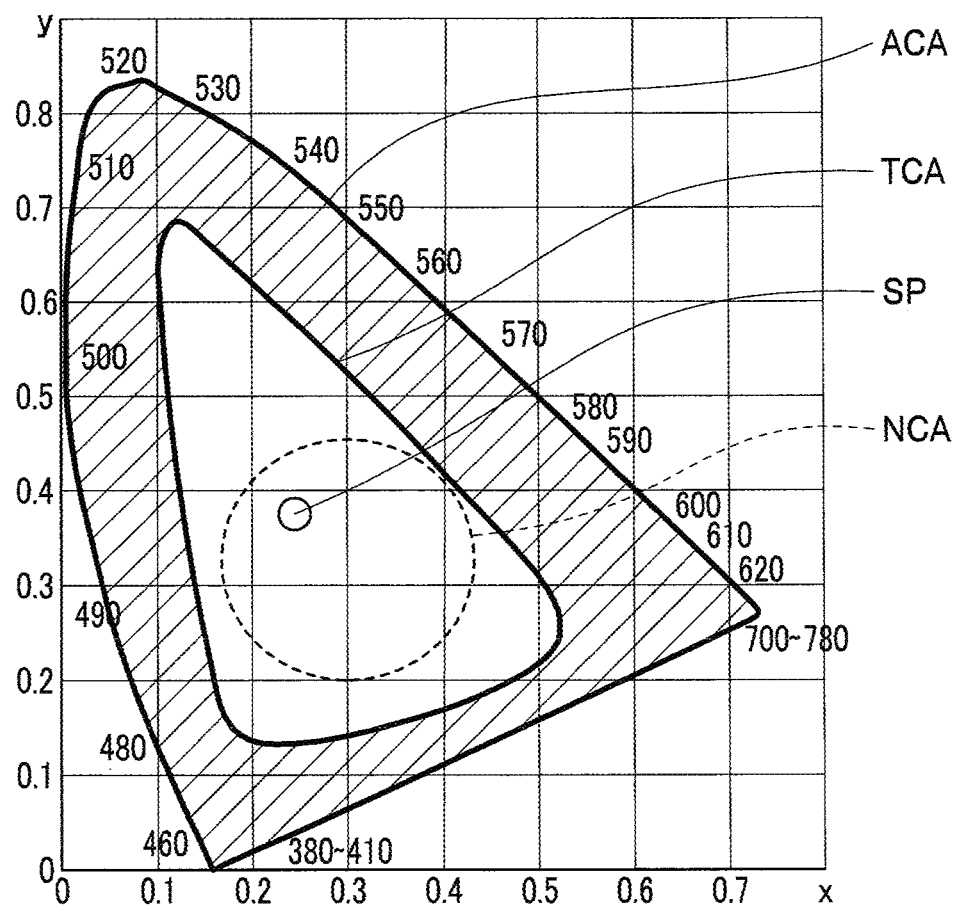
FIG. 8 is a diagram for describing an example of a method for setting a high saturation area in the above-described first embodiment.

FIG. 8 is a diagram for describing an example of a method for setting a high saturation area.

The high saturation area used to judge whether or not a certain pixel has high saturation may be provided as a predetermined area beforehand, but preferably is set adaptively according to the photography scene. Thus, FIG. 8 shows an example of setting a high saturation area based on the plural images to be combined.

First, based on the plural images to be combined, an evaluation image for use to set a high saturation area is created. An image for use as the evaluation image may be a comparative bright image obtained by performing typical comparative bright combination processing on the plural images to be combined, a comparative dark image created by the process of step S2, or another image. Also, in creating the evaluation image, reduced images with reduced pixel counts can be used to reduce processing loads.

Furthermore, when an evaluation image is, for example, a Bayer image, a demosaicking process is used to create the evaluation image, in which individual pixels are color components (RGB components, in this example).

Next, the evaluation image is divided into predetermined plural local images. In so doing, the evaluation image may be divided into equal local images or into local images which differ in size and shape between central and peripheral portions of the evaluation image. Now if the plural local images obtained by division is denoted by a symbol i in distinction, first, average values R(i), G(i), and B(i) of all the pixels contained in each of the local images i are calculated for RGB components and furthermore, average luminance and color difference components of the local image are calculated as follows:

$$Y(i)=\{R(i)+2G(i)+B(i)\}/4$$

$$Cx(i)=\{R(i)-B(i)\}/Y(i)$$

$$Cy(i)=\{R(i)+B(i)-2G(i)\}/Y(i)$$

A process of judging whether or not Cx(i) and Cy(i) of the local image i calculated in this way fall within an achromatic color area NCA determined beforehand and shown in FIG. 8 is performed for all the local images i.

The local images judged to fall within the achromatic color area NCA as a result of the judgment will be denoted by a symbol i' in distinction. Next, respective average values of Cx(i') and Cy(i') are calculated over all the local images i', and the calculated average values are designated as a Cx reference value and Cy reference value for use as references for achromatic color in high-saturation comparative bright combination processing. Coordinates in a color space corresponding to the Cx reference value and Cy reference value provide an achromatic color reference value SP shown in FIG. 8.

Once the achromatic color reference value SP is determined, an area having a predetermined range based on the achromatic color reference value SP as shown in FIG. 8 is designated as a non-high saturation area TCA defined adaptively.

Then, an area (hatched area in FIG. 8) on an outer side of the non-high saturation area TCA in an all color space ACA is designated as a high saturation area. Note that 3-digit numeric values along a contour of the all color space ACA are light wavelengths expressed in nm units.

In this way, high-saturation comparative bright combination processing section 32 serving as a saturation judgment section determines an achromatic color reference value based on image data for plural images and sets a high saturation area according to the determined achromatic color reference value.

Note that the method for setting a high saturation area described herein is exemplary, and another appropriate setting method may be used.

Next, one of the plural images to be combined is read (step S13) and a certain pixel is read out of the read image (step S14).

Furthermore, the high-saturation comparative bright combination processing section 32 judges whether or not the read pixel is within the high saturation area set in step S12 (step S15).

The color component of the read pixel is needed in order to make the judgment, and if the image read in step S13 is, for example, a Bayer image, a demosaicking process is performed, followed further by a process of determining the Cx component and Cy component of the pixel as with the above process.

The demosaicking process here may be performed, for example, as follows to speed up the process by further simplification.

That is, with respect to the pixel Gr in the Bayer array, an average value of the pixels B placed on vertically opposite sides of the pixel Gr is designated as a B component and an average value of the pixels R placed on horizontally opposite sides of the pixel Gr is designated as an R component. Also, with respect to the pixel Gb in the Bayer array, an average value of the pixels B placed on horizontally opposite sides of the pixel Gb is designated as a B component and an average value of the pixels R placed on vertically opposite sides of the pixel Gb is designated as an R component. Furthermore, with respect to the pixel R in the Bayer array, an average value of the pixels Gr placed on horizontally opposite sides of the pixel R is designated as a G component and an average value of the pixels B placed on diagonally opposite sides of the pixel R (or at two of the four diagonally opposite locations) is designated as a B component. Besides, with respect to the pixel B in the Bayer array, an average value of the pixels Gb placed on horizontally opposite sides of the pixel B is designated as a G component and an average value of the pixels R placed on diagonally opposite sides of the pixel B (or at two of the four diagonally opposite locations) is designated as an R component.

When it is judged in step S15 that the pixel is within the high saturation area, the high-saturation comparative bright combination processing section 32 judges whether or not the pixel value of the pixel read in step S14 is brighter (has a larger pixel value) than the corresponding pixel value in the current combined image (step S16). Thus, the image combining section according to the present embodiment is designed to perform high-saturation comparative bright combination processing using the pixel value itself (brightness of the pixel) as the index including the luminance component of the pixel.

When it is determined that the pixel value of the read pixel is brighter, the pixel value in the current combined image is replaced with the pixel value of the pixel read in step S14 (step S17).

When the process of step S17 is finished or when it is judged in step S15 that the pixel is outside the high saturation area or when it is judged in step S16 that the pixel value of the read pixel is not brighter, it is judged whether or not all the pixels of the image read in step S13 have been processed (step S18). Thus, the pixels outside the high saturation area are not subjected to high-saturation comparative bright combination processing.

When it is judged in step S18 that all the pixels have not been processed, the image pickup apparatus goes to step S14 to read a next pixel and perform a process such as described above.

On the other hand, when it is judged in step S18 that all the pixels have been processed, it is judged whether or not all the plural images to be combined have been processed (step S19).

When it is judged that all the images have not been processed, the image pickup apparatus goes to step S13 to read a next image and perform a process such as described above.

In this way, when it is judged in step S19 that all the images have been processed, the image pickup apparatus returns from the current process to a process shown in FIG. 5.

Since the first embodiment configured as described above judges whether or not each of the pixels making up image data has high saturation and performs high-saturation comparative bright combination processing of replacing only the pixels judged to have high saturation with a pixel value of a pixel which has a larger index including a luminance component, an impressive image with increased vividness can be left by removing specific colors of, for example, fireworks smoke, exhaust gas floating on a road, comparatively poor-looking low-saturation fireworks among a large number of fireworks launched together, and headlights on a road.

Also, since an achromatic color reference value and high saturation area are set adaptively based on image data for plural images, an image with optimum saturation can be left according to the photography scene.

Furthermore, use of pixel values as an index including a luminance component in performing high-saturation comparative bright combination processing allows typical comparative bright combination processing to be performed on the pixels in a high saturation area, making it possible to use existing processing circuits and processing programs and thereby slash costs.

Besides, since a comparative dark image can be set as an initial value of the combined image in high-saturation comparative bright combination processing, the combined image can be brought close to black while reducing noise in dark parts such as a night sky, and thus a sharp combined image with a wider dynamic range and a reduced noisy feel is available.

In so doing, by creating a comparative dark image based on the image data for plural images acquired for high-saturation comparative bright combination processing, time required for photographing can be reduced.

Second Embodiment

Figure 13:
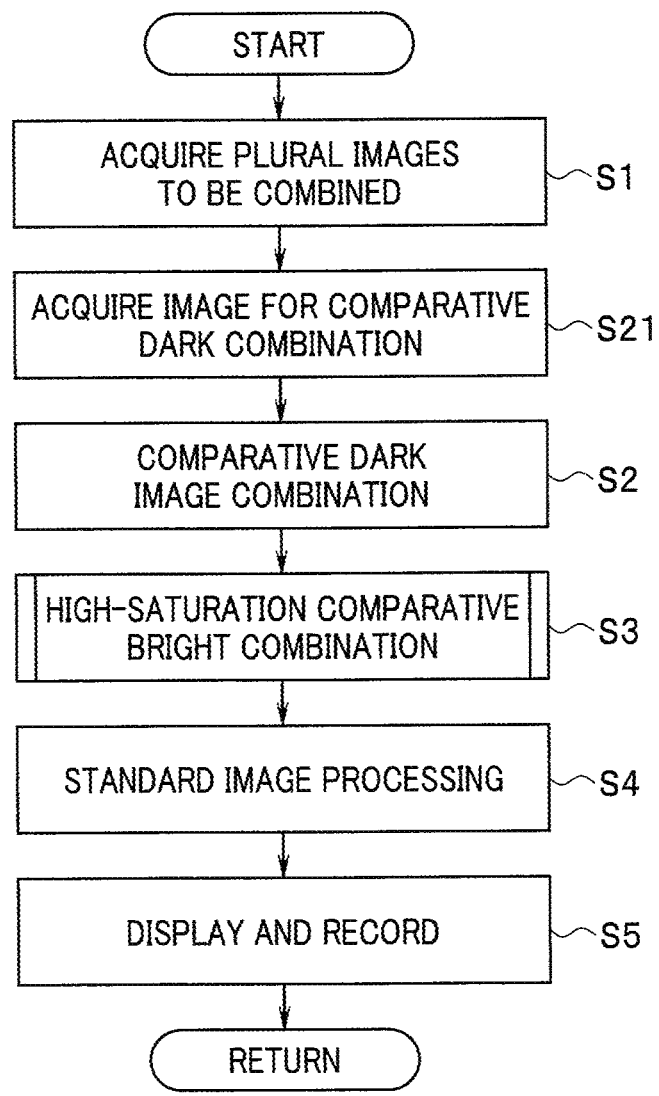
FIG. 13 is a flowchart showing a process of high-saturation comparative bright combination mode on an image pickup apparatus according to a second embodiment of the present invention.
Figure 14:
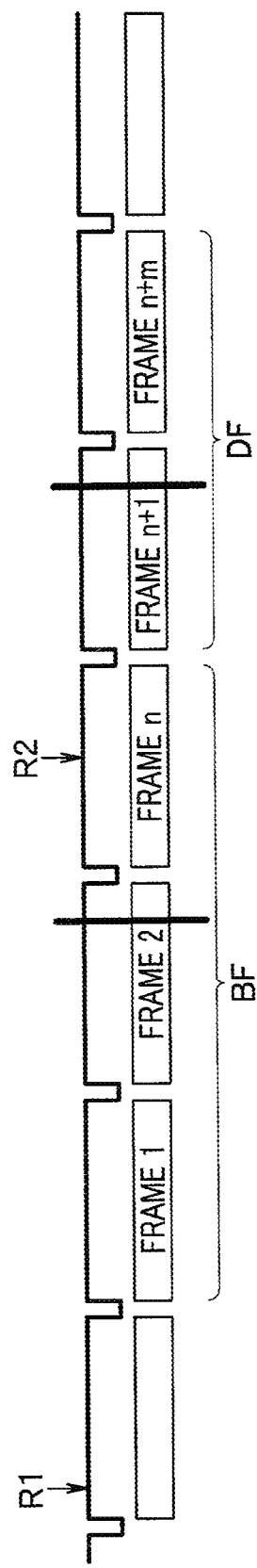
FIG. 14 is a timing chart showing how plural images for high-saturation comparative bright combination are acquired and then plural images for high-saturation comparative dark combination are acquired on the image pickup apparatus according to the above-described second embodiment.

FIGS. 13 to 15 show a second embodiment of the present invention, where FIG. 13 is a flowchart showing a process of high-saturation comparative bright combination mode on an image pickup apparatus.

In the second embodiment, components similar to those of the first embodiment described above are denoted by the same reference numerals as the corresponding components, description thereof will be omitted as appropriate, and mainly differences from the first embodiment will only be described below.

In the embodiment described above, a comparative dark image is created using plural images to be combined in high-saturation comparative bright combination processing. In contrast, in the present embodiment, image data for plural images is acquired with a timing different from a timing of acquiring the image data for plural images to be combined in high-saturation comparative bright combination processing and a comparative dark image is created based on image data including at least the image data for plural images acquired with the different timing. Furthermore, whereas in the first embodiment described above, pixel values are replaced according to results of comparison among magnitudes of the pixel values themselves of read pixels, in the present embodiment, combination evaluation values are calculated from the pixel values of read pixels and pixel values are replaced according to results of comparison among magnitudes of the calculated combination evaluation values.

That is, when the process shown in FIG. 13 is started, plural images to be combined in high-saturation comparative bright combination processing are acquired in step S1, and then an image group for comparative dark combination is acquired separately from the image group for high-saturation comparative bright combination (step S21).

Now, FIG. 14 is a timing chart showing how plural images for high-saturation comparative bright combination are acquired and then plural images for high-saturation comparative dark combination are acquired.

As the user performs the first pressing operation R1 of the release button, and subsequently performs the second pressing operation R2 of the release button, images of frames 1 to n which provide frame information BF for high-saturation comparative bright combination are acquired as with the first embodiment described above.

In the present embodiment, frame information DF for comparative dark combination is acquired from frame (n+1) next to frame n. It is assumed here that m images are acquired as frame information DF. When frame (n+m) is acquired in this way, a photographing process is finished.

Smoke and clouds which reduce sharpness of the image change with time. In contrast, when the image pickup apparatus is fixed, for example, to tripods, the background does not change. Thus, by acquiring an image group for comparative dark combination with a timing different from an image group for high-saturation comparative bright combination, it is possible to acquire a more sharp comparative dark image by eliminating influence of smoke and clouds.

Thus, in step S2 which follows, using images of frames (n+1) to (n+m) acquired as frame information DF, comparative dark image is produced by the comparative dark combination processing section 31.

Subsequently, the processes of steps S3 to S5 are performed and the image pickup apparatus returns from the current process to the main process (not shown).

Incidentally, although in the above, the image group for comparative dark combination is acquired after acquisition of the plural images for high-saturation comparative bright combination and comparative dark combination is performed using the image group of frames (n+1) to (n+m), comparative dark combination may be performed using all the images of frames 1 to (n+m) (in that case, a comparative dark image is created based on image data including image data for plural images acquired with a timing different from the timing of acquiring image data for plural images for high-saturation comparative bright combination) and the image group for comparative dark combination may be acquired before acquiring the plural images for high-saturation comparative bright combination. Alternatively, if a comparative dark image has already been created in a same photography scene at the time of previous photographing (this is often the case when tripods are used for photographing), the comparative dark image may be used. For example, in the case of fireworks photography, an amount of smoke increases with increases in the number of launched fireworks, and thus if a comparative dark image is created at the start of launches or before starting launches, a more desirable comparative dark image can be obtained.

Next, FIG. 15 is a flowchart showing details of the high-saturation comparative bright combination processing in step S3 of FIG. 13. The high-saturation comparative bright combination processing is performed by the high-saturation comparative bright combination processing section 32, which is part of the image combining section, under the control of the camera control section 12.

Once this process is started, the processes of steps S11 to S15 are performed.

Then, if it is judged in step S15 that the pixel is within the high saturation area, a combination evaluation value P of the pixel read in step S14 is calculated as an index including a luminance component of the pixel (step S31).

That is, if the luminance and color difference components of the pixel read in step S14 are Y, Cx, and Cy, the combination evaluation value P is calculated as follows: $P = k \times Y + l \times Cx + m \times Cy$, where k, l, and m are weighting factors assigned to the respective components Y, Cx, and Cy in calculating the combination evaluation value P. By adjusting the weighting factors, it is possible to obtain the combination evaluation value P by attaching importance to any of Y, Cx, and Cy as desired. For example, if settings are made such that $l > k$ and $l > m$, the combination evaluation value P can be obtained by attaching importance to the Cx component.

Next, it is judged whether the calculated combination evaluation value P is larger than a combination evaluation value P0 of the corresponding pixel in the current combined image (step S32).

Now if it is judged that the combination evaluation value P is larger than the combination evaluation value P0, the image pickup apparatus goes to step S17 to replace the pixel value in the current combined image with the pixel value of the pixel read in step S14 as described above.

Thus, the image combining section according to the present embodiment performs high-saturation comparative bright combination processing using a combination evaluation value obtained by calculating a weighted sum of luminance and color difference components of pixels as an index including a luminance component.

When the process of step S17 is finished or when it is judged in step S15 that the pixel is outside the high saturation area or when it is judged in step S32 that the combination evaluation value P is equal to or smaller than the combination evaluation value P0, the processes of steps S18 and S19 are performed. Thus, any pixel judged to be outside the high saturation area or any pixel whose combination evaluation value P is equal to or smaller than the combination evaluation value P0 is left out of pixel value replacement.

In this way, when it is judged in step S19 that all the images have been processed, the image pickup apparatus returns from the current process to a process shown in FIG. 13.

The second embodiment configured as described above provides advantages similar to those of the first embodiment. Also, since the image data for plural images for comparative dark combination processing is acquired with a timing different from the timing of acquiring the image data for plural images to be combined in high-saturation comparative bright combination processing, a more pure background scene can be obtained by removing factors (e.g., smoke or fireworks) which will reduce the saturation of the background of the image, and thus a more desirable high-saturation comparative bright image can be obtained.

Also, since high-saturation comparative bright combination processing is performed using a combination evaluation value P obtained by calculating a weighted sum of luminance and color difference components of pixels as an index including a luminance component, it is possible for example, to select red or blue pixels on a priority basis (color selection) or select pixels with priority given to either saturation or brightness rather than simply selecting brighter pixels, and consequently a combined image can be created more in line with the user's intent.

Note that the various components described above may be configured as circuits. Then, any of the circuits may be implemented as a single circuit or in combination with plural circuits as long as an intended function can be achieved. Furthermore, any of the circuits may be implemented not only by a special-purpose circuit configured to serve an intended function, but also by a general-purpose circuit configured to serve an intended function by performing a processing program.

Also, although an image pickup apparatus has mainly been described above, the present invention is also applicable to an image processing apparatus adapted to perform comparative dark combination processing or high-saturation comparative bright combination processing such as described above using image data for plural images acquired by picking up images of an object in time sequence by an image pickup apparatus. Besides, the present invention is applicable to an image pickup method or image processing method for performing processes similar to those of the image pickup apparatus or image processing apparatus, a processing program configured to cause a computer to perform processes similar to those of the image pickup apparatus or image processing apparatus, a computer-readable non-temporary recording medium configured to store the processing program, or the like.

Having described the preferred embodiments of the invention referring to the accompanying drawings, it should be understood that the present invention is not limited to those precise embodiments and various changes and modifications thereof could be made by one skilled in the art without departing from the spirit or scope of the invention as defined in the appended claims.

What is claimed is:

1. An image processing apparatus comprising:
a saturation judgment section adapted to judge whether or not saturation of individual pixels making up image data of plural images falls within a high saturation area, the image data being acquired by picking up images of an object in time sequence; and
an image combining section adapted to perform high-saturation comparative bright combination processing on the image data of plural images, where the high-saturation comparative bright combination processing involves replacing only pixels judged by the saturation judgment section to fall within the high saturation area out of the individual pixels making up the image data with a pixel value of a pixel which has an index including a luminance component, the index being larger.

2. The image processing apparatus according to claim 1, wherein the saturation judgment section determines an achromatic color reference value based on the image data of plural images and sets the high saturation area according to the determined achromatic color reference value.

3. The image processing apparatus according to claim 1, wherein the image combining section performs the high-saturation comparative bright combination processing using a pixel value as the index including a luminance component.

4. The image processing apparatus according to claim 1, wherein the image combining section performs the high-saturation comparative bright combination processing using a combination evaluation value obtained by calculating a weighted sum of luminance and color difference components of pixels as the index including the luminance component.

5. The image processing apparatus according to claim 1, wherein the image combining section includes a comparative dark combination processing section adapted to create a comparative dark image by performing comparative dark combination processing on image data of plural images, and sets the created comparative dark image as an initial value of a combined image in the high-saturation comparative bright combination processing.

6. The image processing apparatus according to claim 5, wherein the comparative dark combination processing section creates the comparative dark image based on the image data of plural images acquired for the high-saturation comparative bright combination processing.

7. The image processing apparatus according to claim 1, further comprising:
an image pickup section adapted to acquire image data by picking up an image of an object; and
a control section adapted to cause the image pickup section to acquire image data of plural images by performing image pickup in time sequence.

8. The image processing apparatus according to claim 7, wherein
the image combining section includes a comparative dark combination processing section adapted to create a comparative dark image by performing comparative dark combination processing on image data of plural images, and sets the created comparative dark image as an initial value of a combined image in the high-saturation comparative bright combination processing, the control section causes the image pickup section to acquire image data of plural images with a timing different from a timing of acquiring the image data of plural images for the comparative dark combination processing, and the comparative dark combination processing section creates the comparative dark image based on image data including the image data of plural images acquired at least with the different timing.

9. An image processing method, comprising:

a saturation judgment step of judging whether or not saturation of individual pixels making up image data of plural images falls within a high saturation area, the image data being acquired by picking up images of an object in time sequence; and an image combining step of performing high-saturation comparative bright combination processing on the image data of plural images, where the high-saturation comparative bright combination processing involves replacing only pixels judged in the saturation judgment step to fall within the high saturation area out of the individual pixels making up the image data with a pixel value of a pixel which has a larger index including a luminance component.

* * * * *